L. M. Ferry,
Hose Coupling.
No. 1571. Reissued Nov. 24 1863.
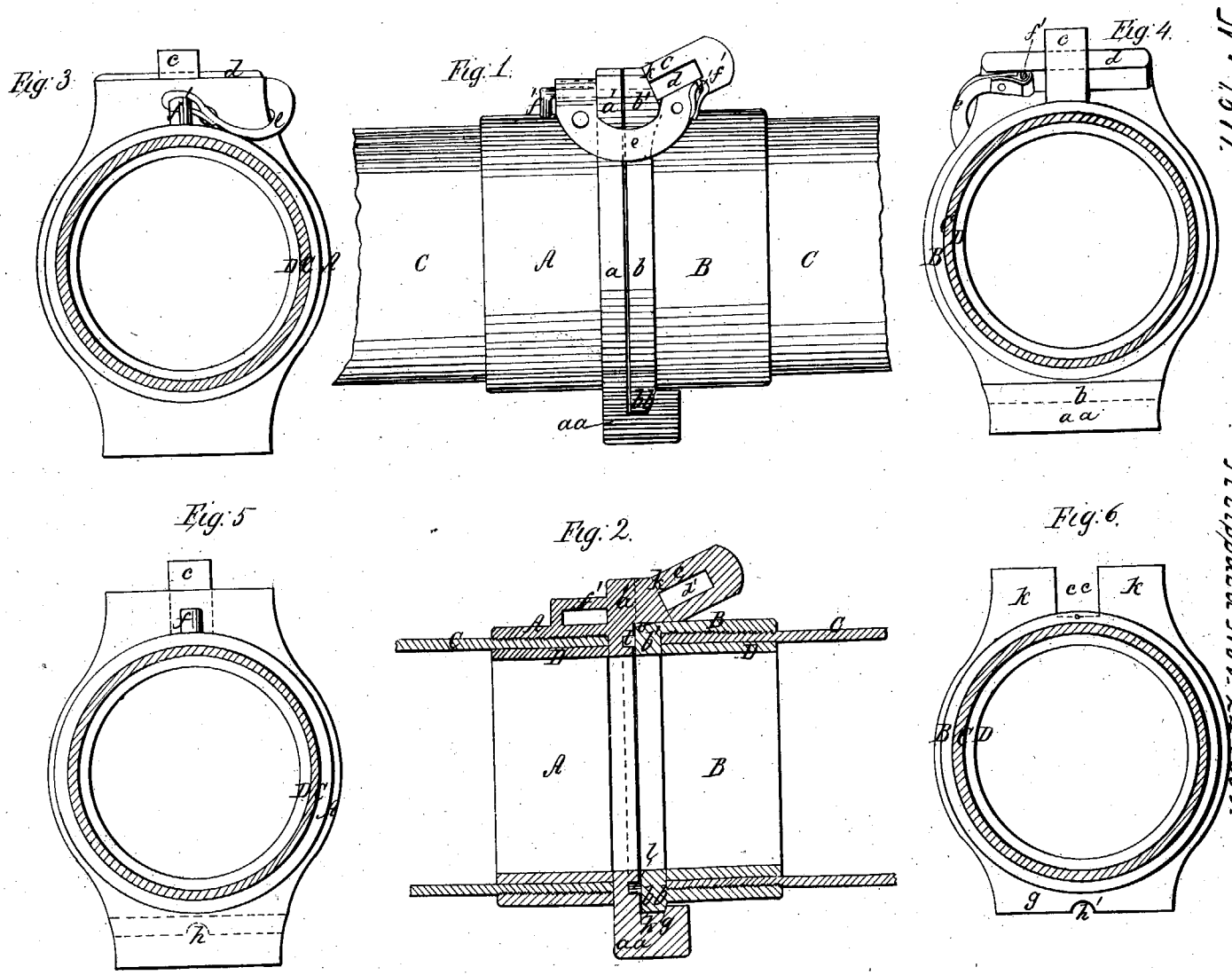
N. PETERS. PHOTO-LITHOGRAPHER, WASHINGTON, D. C.

UNITED STATES PATENT OFFICE.

EMERSON GAYLORD, OF CHICOPEE, MASSACHUSETTS, ASSIGNEE, BY MESNE ASSIGNMENTS, OF L. M. FERRY, OF SAME PLACE.

IMPROVEMENT IN HOSE-COUPLINGS.

Specification forming part of Letters Patent No. 15,846, dated October 7, 1856; Reissue No. 1,186, dated May 21, 1861; Reissue No. 1,571, dated November 24, 1863.

*To all whom it may concern:*

Be it known that I, EMERSON GAYLORD, of Chicopee, in the county of Hampden and State of Massachusetts, am the sole assignee of JAMES T. AMES, of Chicopee, aforesaid, assignee of L. M. FERRY, who invented the hereinafter-described Hose-Coupling; and I do hereby declare that the following is a full, clear, and exact description of the same, reference being had to the accompanying drawings, making part of this specification, in which—

Figure 1 is a side view of the said coupling; Fig. 2, a longitudinal section thereof; Figs. 3, 4, 5, and 6, end views of the two parts of the coupling.

The same letters indicate like parts in all the figures.

The object of the said invention is to obtain a simple, economical, and efficient water-tight coupling for hose, which can be easily and quickly coupled to form a water-tight joint.

In the accompanying drawings, A and B represent the two parts of the coupling, which are best made of metal. They are both hollow cylinders, to the inside of each of which the hose C C are secured by any suitable means. A suitable mode of attachment is represented in the accompanying drawings. The bore of each of the parts A and B is threaded and screwed onto the end of the hose C C, the ends thus inserted being sustained by ferrules D D. The outer end faces of the two parts A and B are flat and extended with projecting flanges *a* and *b*, and the face of the part A is grooved to receive an elastic packing-ring, *l*, which should be made of leather or equivalent material. This packing-ring projects sufficiently from the face of the part A to insure a water-tight joint with the face of the part B when forced against it. One side of the flange *a* is formed with a hook, *a a*, the inner face of which is inclined to the plane of the packed face; and the opposite side of the said flange is formed with a staple-like projection, *c*, having a mortise through it for the reception of a wedge-key, *d*. The inner edge of this staple *c* is at an inclination with the axis of the part A. The part B is also provided with a flange, *b*, and at *b'* the inner face of this flange is beveled to correspond with the beveled or inclined face of the hook *a a* of the part A. The flange *b*, on the opposite side, projects, as at K K, leaving a recess, as at *c c*, for the reception of the mortised staple *c* of the part A, the bottom of the recess between the projections K K being inclined or beveled to correspond with the inclination of the inner edge of the staple *c*.

The parts thus formed, it will be seen, can be readily coupled by inserting the projecting flange *b b* of the part B into the hook *a a* of the part A, and pushing the face of the part B against the packing-ring *l* on the face of the part A. The mortised projection *c* will then extend through the recess *c c* between the projections K K of the flange *b*, and then by driving the key *d* into the mortise the face of the part B will be forced against the packing-ring *l* all around, so as to make a water-proof joint, because driving in the key *d* has not only the effect of drawing together the two parts of the coupling A and B on that side of the joint where the key acts, but in so drawing them together the beveled bottom of the recess *c c* of the part B comes into contact with the beveled inner edge of the staple *c* of the part A, which causes the two parts A and B to slide on each other, thus forcing the beveled flange *b b* into the hook *a a*, which, being correspondingly beveled, acts wedge-like to draw the two parts of the coupling together on that side with equal force. In this way a perfectly water-tight joint is formed between the two parts of the coupling by the simple application of force in one direction by a key, or equivalent means, the force so applied on one side by the mode of operation exerting a force all around.

If it be desired to prevent lateral play, the edge of the flange *b b* can be notched, as at *h'*, to embrace a corresponding projection in the bottom of the hook *a a*, and to prevent the key *d* from being lost it can be attached to a leather strap, *e*, by a loop, *f'*.

What is claimed as new in hose-coupling, and desired to be secured by Letters Patent, is—

Combining with an interposed elastic packing-ring the connecting and disconnecting of the two parts, substantially as described, so that by the application of force to one side only of the coupling the two parts will be drawn together all around, as described, and thereby insure a water-tight joint or entirely release them from their bond of union with each other.

EMERSON GAYLORD.

Witnesses:
GEO. M. STEARNS,
JOHN DORNE.